United States Patent
Stephan et al.

(10) Patent No.: US 6,419,068 B1
(45) Date of Patent: Jul. 16, 2002

(54) PARK GEAR DAMPER FOR AN AUTOMATIC TRANSMISSION FOR AN AUTOMOTIVE VEHICLE

(75) Inventors: Craig Hammann Stephan; James Claude Brazin, both of Ann Arbor; James Michael Dosdall, Grosse Ile; James Thompson Hodgson, III, Canton; Taha F. Hussain, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/694,913

(22) Filed: Oct. 24, 2000

(51) Int. Cl.$^7$ ............................ B60K 41/26; F16H 57/00
(52) U.S. Cl. ........................ 192/219.5; 74/411; 74/443; 192/30 V
(58) Field of Search ............................ 192/219.4, 219.5, 192/209, 149, 30 V; 188/31, 69; 464/74, 83, 89; 74/411, 443, 575

(56) References Cited

U.S. PATENT DOCUMENTS 2,739,462 A * 3/1956 Wincenciak ................. 464/74
2,961,856 A * 11/1960 Selzer ......................... 464/74
4,719,999 A * 1/1988 Ohkubo ..................... 192/219.5
4,722,427 A * 2/1988 Prumbaum et al. ...... 192/219.5
5,927,149 A * 7/1999 Moody ........................ 74/443

FOREIGN PATENT DOCUMENTS

JP          58-39866        * 3/1983

* cited by examiner

Primary Examiner—Rodney H. Bonck
(74) Attorney, Agent, or Firm—Frank G. McKenzie

(57) ABSTRACT

The invention comprises a park mechanism for an automatic transmission comprising a toothed wheel secured to the torque output shaft of the transmission and a park pawl mounted pivotally on a transmission housing. The pawl has a pawl tooth engageable with tooth spaces on the toothed wheel, thereby locking the transmission torque output shaft against rotary motion. Torsional damper elements are carried by the torque output shaft and by the toothed wheel. Damper elements are located between registering radial extensions of the toothed wheel on the inside diameter of the toothed wheel and on a hub that is secured drivably to the torque output shaft, thereby permitting limited toothed wheel motion relative to the torque output shaft cushioning inertia forces as the pawl tooth engages a tooth space on the toothed wheel.

4 Claims, 5 Drawing Sheets

| | COAST CLUTCH | DIRECT CLUTCH | FORWARD CLUTCH | | FRONT BAND | INTERMEDIATE BAND | LOW/REVERSE BAND | | FRONT O.W.C. | REAR O.W.C. |
|---|---|---|---|---|---|---|---|---|---|---|
| | CL1 | CL2 | CL3 | | B1 | B2 | B3 | | OWC1 | OWC2 |
| D1 (1ST GEAR) | A | | X | | | | | | X | X |
| D2 (2ND GEAR) | A | | X | | | X | | | X | OR |
| D3 (3RD GEAR) | A | X | X | | | X | | | X | OR |
| D4 (4TH GEAR) | | X | X | | X | | | | OR | OR |
| REVERSE GEAR | A | X | | | | | X | | X | |
| | | | | | | | | | | |
| MANUAL 1 | X | | X | | | | X | | X | (X) |
| MANUAL 2 | X | | X | | | X | X | | X | OR |

A WITH O.D. CANCELLED

PARK GEAR DAMPER FOR AN AUTOMATIC TRANSMISSION FOR AN AUTOMOTIVE VEHICLE

TECHNICAL FIELD

The invention relates to parking brakes for automatic transmissions for automotive vehicles.

BACKGROUND ART

Automotive automatic transmissions typically include a hydrokinetic torque converter with a bladed impeller connected to an engine and a turbine connected to gearing. The gearing forms multiple torque flow paths between the turbine and vehicle traction wheels. The transmission may include a transmission park mechanism comprising a toothed wheel connected to a torque output shaft of the transmission and a brake pawl pivoted on the transmission housing.

The pawl has a pawl tooth engageable with tooth spaces on the toothed wheel. This constrains the vehicle against movement under gravity when the vehicle is parked on a sloped surface, for example.

Engagement of the pawl tooth may require slight rotation of the torque output shaft in order to align the pawl tooth with one of the tooth spaces on the toothed wheel. As the pawl drops in place under a spring force, rotation of the output shaft is abruptly locked, sometimes with considerable inertia force impact against a side of an external tooth on the toothed wheel.

The torque-transmitting elements of the powertrain for the vehicle include the transmission, a driveshaft, and the vehicle suspension system. Provision is made for isolating vehicle passengers from noise, vibration and harshness developed by the road wheels by relying on torsional elasticity of these torque-transmitting elements. When the vehicle engine is idling, torque is delivered by the turbine of the automatic transmission torque converter to the traction wheels through multiple-ratio gearing. As the traction wheels are held stationary by wheel brakes, the idling torque of the engine, which is multi plied by the hydrokinetic torque converter, is capable of straining the elastic elements of the powertrain.

When the gear selector mechanism is moved by the vehicle operator out of a forward-driving gear or out of reverse gear into the park mode, torque flow to the traction wheels is removed. This allows strain on the powertrain elements to relax, thereby producing a backlash. The backlash may occur at the instant the park gear tooth engages a tooth space. This often causes the elastic elements in the powertrain to create an objectionable engagement noise in the park mechanism as the pawl tooth engages the side of a tooth of the toothed wheel.

DISCLOSURE OF INVENTION

It is an objective of the invention to provide a park gear mechanism for an automatic transmission of the kind described in the preceding discussion whereby elastic damping elements are introduced into the torque flow path as the park mechanism is engaged, thereby decelerating the torque output shaft over a finite angular displacement. This reduces any peak force spike caused by inertia force impact of the park gear with the park pawl as the park mechanism is engaged by the vehicle operator.

An embodiment of the invention includes elastic damping elements, which introduce compliance in the powertrain during engagement of the park gear mechanism. They are located between external projections or drive members on a hub for the park gear mechanism and internal projections or drive members on a park gear toothed wheel. Torsional forces in the powertrain deform the compliant elastic damping elements, which are sized to absorb typical driveshaft unwind occurrences within the limits of the design deformation.

The improved damper mechanism is capable of withstanding maximum torsional forces imposed by a parked vehicle as hard stops on the park gear hub and on the surrounding toothed wheel are engaged at the limit of the design deformation of the compliant elements.

The toothed wheel surrounds the park gear hub, which is secured to the transmission driven shaft. It has external park gear teeth on its periphery. The external drive members extend radially outward from the park gear hub.

The internal drive members extend radially inward from the toothed wheel. A park pawl is pivotally mounted on a housing portion of the transmission mechanism, the pawl having a pawl tooth engageable with a space between two adjacent park gear teeth, thereby locking the driveshaft stationary in a vehicle park mode.

The elastic elements are located between adjacent surfaces of the internal drive members and the external drive members whereby torsional inertia forces are cushioned as the pawl tooth enters a park gear tooth space during the vehicle park mode. Gaps between at least one external drive member and adjacent internal drive member provide deformation limits for the elastic elements.

BRIEF DESCRIPTION OF DRAWINGS

FIG. 4b is a cross-sectional view of the rod of FIG. 4a as seen from the plane of section line 4b—4b of FIG. 4a;

BEST MODE FOR CARRYING OUT THE INVENTION

Figures 1, 1A:
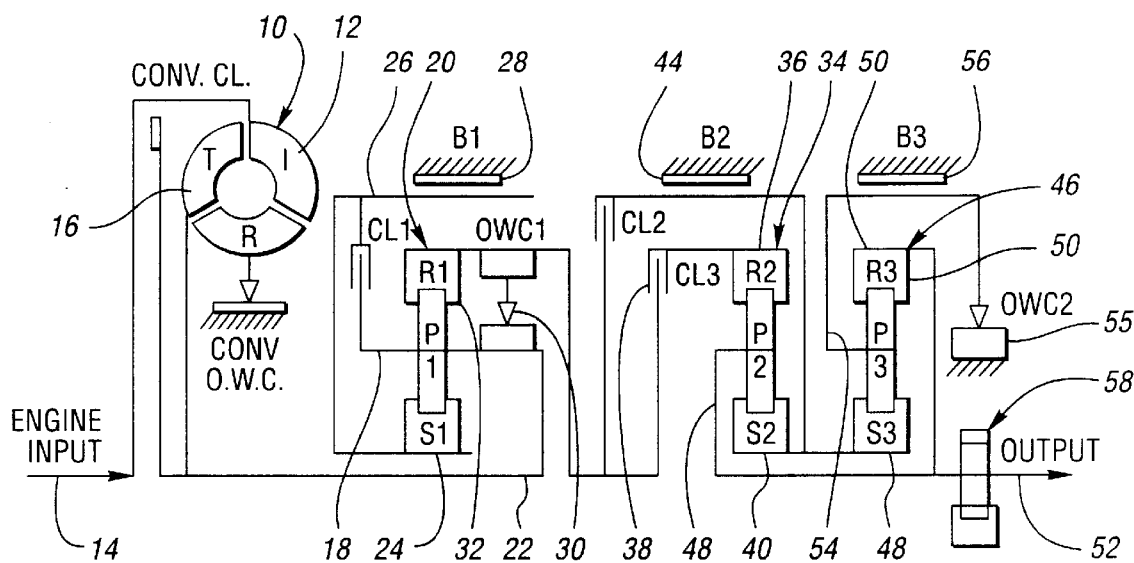
FIG. 1 is a schematic representation of a geared automotive transmission, which is a structural environment for the park gear mechanism of the invention.
FIG. 1a is a chart showing the clutch and brake engagement-and-release pattern for the transmission schematic illustrated in FIG. 1.

FIG. 1 shows an automatic transmission capable of embodying the park brake mechanism of the invention. It comprises a torque converter 10 with an impeller 12 connected to the crankshaft 14 of an internal combustion engine.

Turbine 16 of the torque converter 10 is connected to planetary carrier 18 of a first simple planetary gear unit 20, the connection being established by turbine shaft 22. Sun gear 24 of the gear unit 20 is connected to brake drum 26, which is anchored during fourth speed ratio operation by brake band 28. Overrunning coupling 30 establishes a direct-drive connection between driven shaft 22 and ring gear 32 when the brake 28 is released.

A second planetary gear unit 34 has a ring gear 36 connected through forward clutch 38 to ring gear 32 of gear unit 20.

Sun gear 40 of gear unit 34 is connected to ring gear 32 of gear unit 20 through direct-drive clutch 42. Sun gear 40 can be braked by friction brake band 44.

A third planetary gear unit 46 has a sun gear 48 that is common to sun gear 40. The carrier 48 for gear unit 34 and the ring gear 50 for gear unit 46 are connected to torque output shaft 52. The carrier 54 for gear unit 46 is anchored during forward-drive operation in the first ratio by overrunning coupling 55. Carrier 54 is anchored by a brake band 56 during reverse-drive operation.

The torque output shaft 52 is braked, when the transmission is conditioned for park mode, by a park gear mechanism generally indicated by reference numeral 58. This park gear mechanism will be described with reference to FIGS. 2–6.

FIG. 1a is a chart showing the clutch and brake engagement-and-release pattern for the clutches and brakes shown schematically in FIG. 1 as the transmission is conditioned for operation in each of four forward-driving ratios and a single reverse ratio. The "X" symbols in FIG. 1a indicate an applied clutch or brake, and the "OR" symbols represent an overrunning state for the overrunning couplings.

When one of the forward-driving ratios is selected, turbine torque from turbine 16 is distributed through the gearing. Idle torque at the output shaft 52, during forward-drive mode, is highest when the transmission is conditioned for the lowest forward-driving ratio with clutch 38 engaged and with the overrunning coupling 54 acting as a reaction element. When the transmission is conditioned for reverse drive, reverse driving torque is transmitted to the shaft 52 as brake 56 is applied and overrunning coupling 30 is engaged. In either case, compliant elements in the powertrain are strained due to engine idling torque distributed through the torque flow paths of the gearing.

Figure 2:
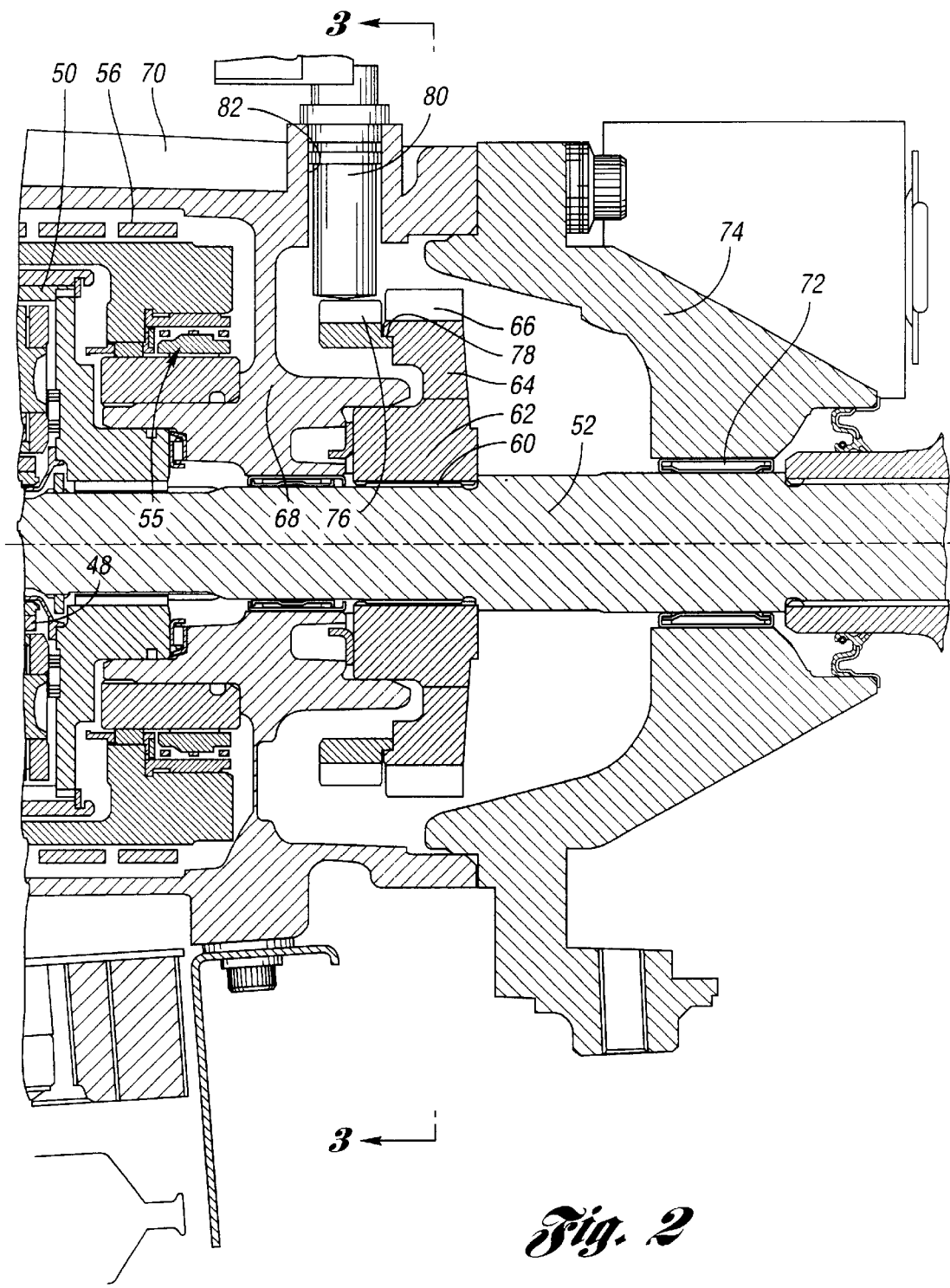
FIG. 2 is an enlarged, cross-sectional view of the torque output shaft and the park gear mechanism of the invention, the cross-sectional view of FIG. 2 being a portion of the transmission schematically shown in FIG. 1.
Figures 5, 5A:
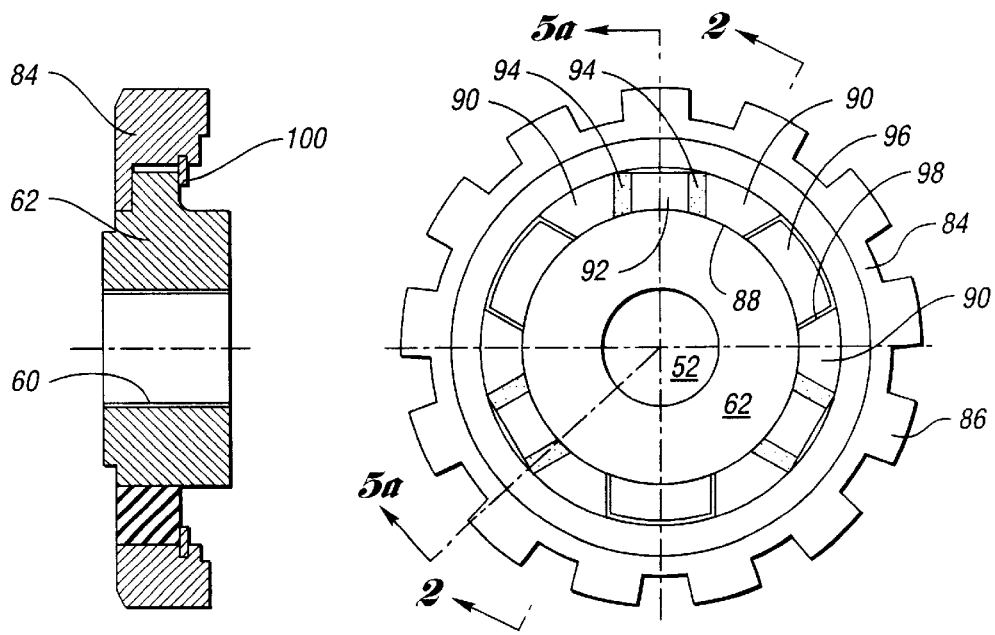
FIG. 5 is an enlarged view of the toothed wheel shown in FIG. 3.
FIG. 5a is a cross-sectional view taken along the plane of section line 5a—5a of FIG. 5.

FIG. 2 shows an enlargement of the rear portion of the transmission shown in FIG. 1 with the park gear shown in detail. FIG. 2 is taken along the section line 2—2 of FIG. 5. FIG. 5 will be described subsequently.

In FIG. 2, the torque output shaft 52 is splined at 60 to the hub 62 of park gear 64. External park gear teeth 66 are situated about the periphery of the park gear. Shaft 52 is rotatably supported in a bearing support end wall 68 for the transmission housing 70. It is supported also by bearings 72 in a bearing opening formed in transmission end plate 74.

A driven shaft speed sensor includes a toothed wheel 76 carried by park gear 64. It may be welded or secured to park gear 64 by a friction fit, as shown at 78. A magnetic speed pickup sensor 80 is secured in sensor opening 82 formed in the transmission housing 70. The end of the sensor 80 is in close proximity to the teeth of the toothed wheel 76.

FIG. 5 and FIG. 5a show the park gear in detail. The park gear comprises a toothed wheel 84 with a plurality of park gear teeth 86 located about the periphery of the wheel. The wheel has an inside diameter 88. A plurality of internal drive members or stops 90 extend inwardly. These are spaced about the axis of park gear hub 62, the latter being splined to torque output shaft 52.

The hub 62 has a plurality of radially extending drive members or stops 92, each stop 92 being situated between adjacent drive members or stops 90 of the toothed wheel. A space is provided between adjacent sides of the stops 90 and 92. Each space receives a compliant elastomer insert 94, which separates the side of a stop 92 from the adjacent side of a stop 90. The hub 62 also has radially extending stops 96, each stop being received within a space between adjacent, inwardly-extending stops 90 of the toothed wheel. A deformation gap 98 is located between each side of the stop 96 and the adjacent faces of the stops 90. When the shaft 52 is under torque, the elastomer inserts 94 will deform, thereby decreasing the deformation gap 98 on one side the stop 96 while correspondingly increasing the deformation gap on the opposite side.

The toothed wheel 84 is held axially fast on the hub 62 by a snap ring 100 located in a snap ring groove in toothed wheel 84, as shown in FIG. 5a.

FIGS. 3, 4, 4a, 4b and 6 show a linkage mechanism actuated by the driver for engaging and disengaging a pawl 102 with respect to the toothed wheel 84. The pawl comprises a body 104 that is pivoted on a pawl pivot shaft 106 secured within an opening formed in the transmission housing 70.

One end of the pawl body carries a pawl tooth 108 that is engageable with tooth spaces between the teeth 86 of the toothed wheel. The pawl normally is biased in a counter-clockwise direction, as viewed in FIG. 3, by a torsion spring 110, one end of which reacts against the transmission body. The torsion spring 110 surrounds the pivot pin 106. Spring 110 normally urges the pawl tooth 108 out of engagement with the toothed wheel.

Figure 4:
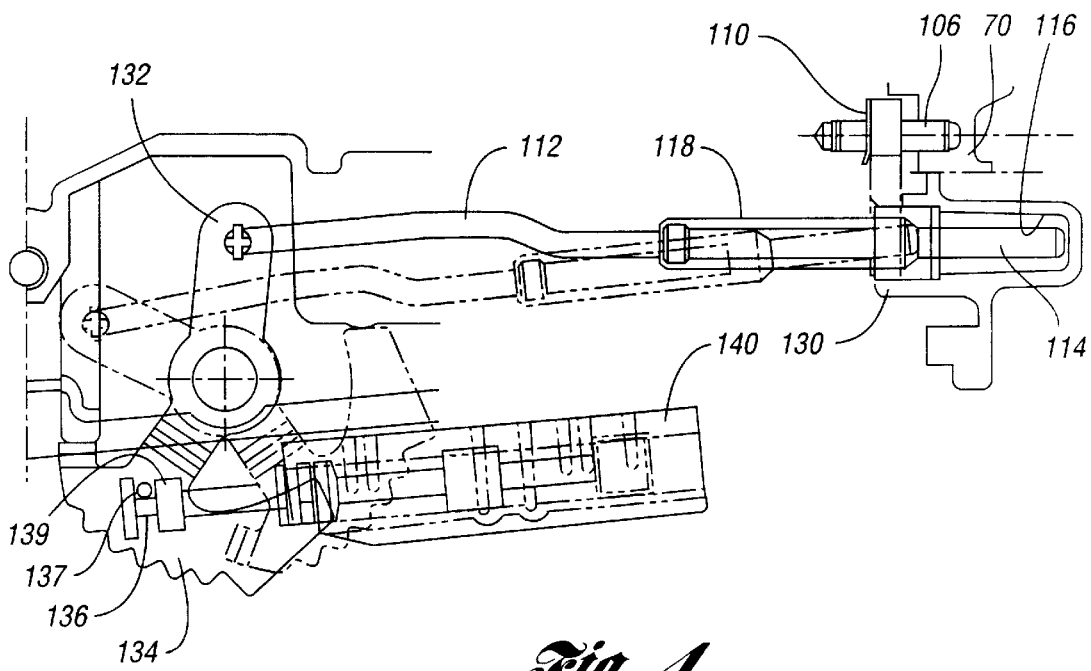
FIG. 4 is a schematic representation of a driver-actuated linkage mechanism for actuating the park pawl shown in FIG. 3.
Figure 4B:
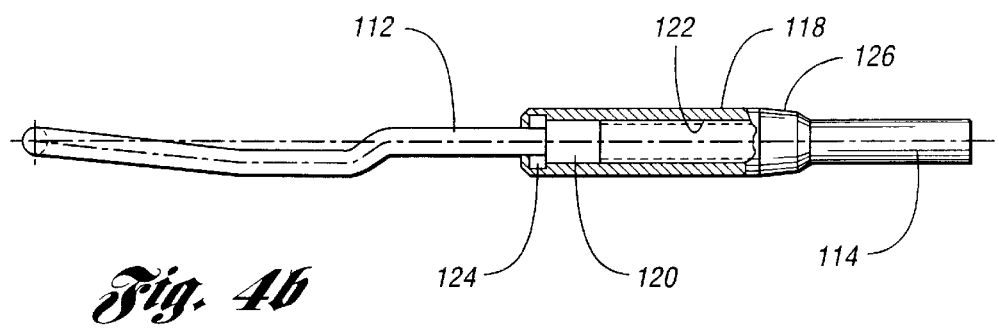
Figure 4A:
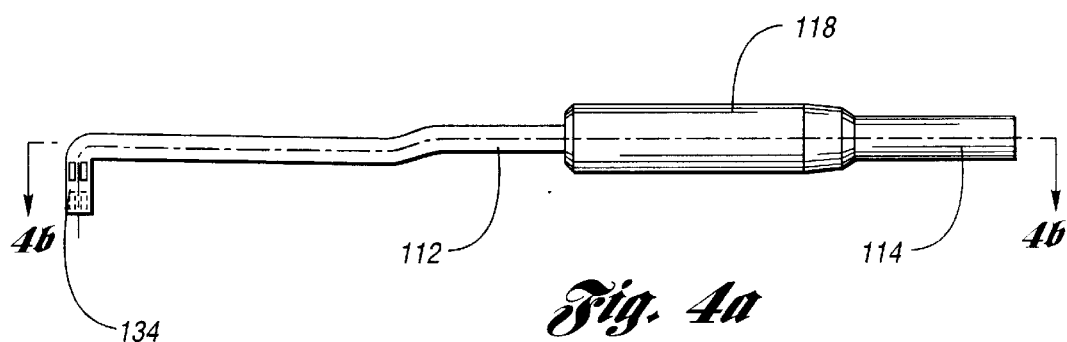
FIG. 4a is a detail view of an actuator rod for the park linkage mechanism of FIG. 4.
Figure 6:
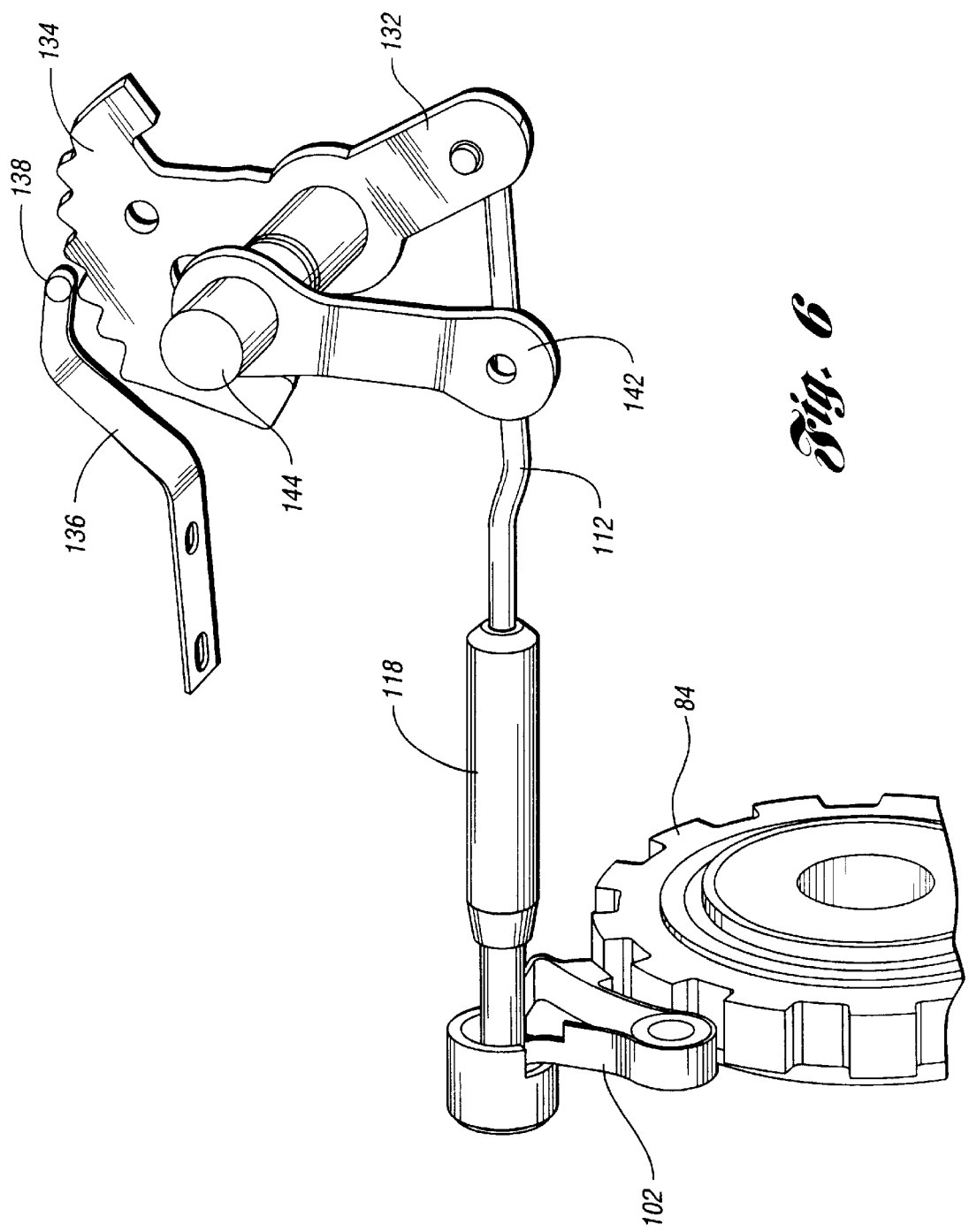
FIG. 6 is a schematic, isometric view of the actuating linkage for the pawl illustrated in FIG. 3.

The pawl is moved into engagement with the toothed wheel by a driver-operated linkage mechanism and cam best seen in FIGS. 4b, 4a and 6. The linkage mechanism comprises an actuator rod 112 having one end 114 received in a pocket 116 in the housing, as shown in FIG. 4. A bullet-shaped cam 118 surrounds the rod 112, as seen in FIGS. 4b and 4a. The cam 118 is hollow and the rod 112 extends through it. The rod 112 has an enlarged abutment portion 120, which assists in stabilizing the cam 118 as it is moved along the rod. A compression spring 122 surrounds the rod 112 and is seated on the right-hand end of the opening in cam 118, as seen in FIG. 4b. A rod guide and seal element 124 surrounds the rod 112 at the left-hand end in the opening of the cam 118.

Figure 3:
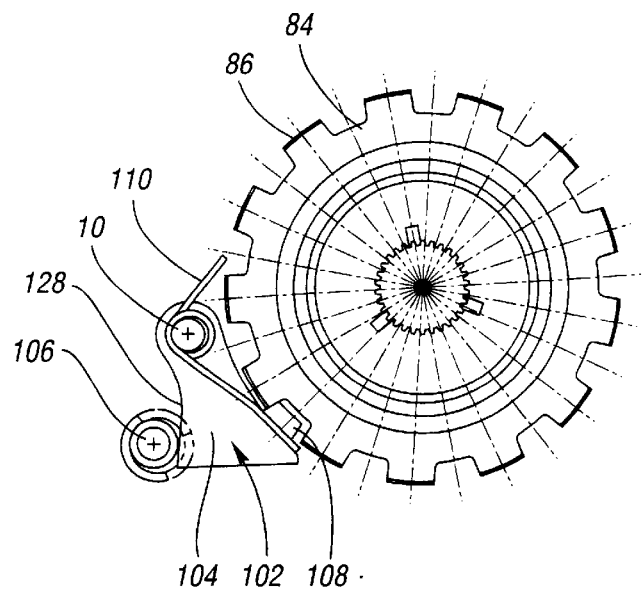
FIG. 3 is a cross-sectional view taken along the plane of section line 3—3 of FIG. 2.

The right-hand end of the cam 118 is provided with a cam surface 126, which engages a cam edge 128 on the pawl body 104, as seen in FIG. 3.

When the rod 112 is moved in a right-hand direction, as viewed in FIGS. 4a and 4b, the cam surface 126 engages the cam edge 128. The reaction force of the engaging cam surfaces compresses spring 122 as the rod 112 moves in a right-hand direction. When the rod 112 is positioned as shown in FIG. 4, the pawl tooth 108 is fully engaged with a tooth space on the tooth wheel. The reaction force caused by the engagement of the cam surface 126 with the cam edge 128 is accommodated by a reaction shoulder 130 on the housing, as shown in FIG. 4.

If the cam tooth 108 is not in alignment with the tooth space on the toothed wheel, it will engage the top of a tooth 86 upon movement of the rod in a right-hand direction. As the spring 122 becomes compressed, the rod end will move into space 116. When the toothed wheel rotates slightly, the pawl tooth 108 will become aligned with a tooth spaced in the toothed wheel. The spring force of spring 122 then will cause the tooth 108 to be snapped into the engaged position, as shown in FIG. 3.

FIG. 4 shows the lever mechanism for operating the rod 112. It comprises a lever 132 that has an opening that receives the end of rod 112, as shown at 134 in FIG. 4a. The opposite end of the lever 132 carries a detent plate 134, sometimes referred to as a "rooster comb". A spring detent, seen in FIG. 6 at 136, carries a detent roller 138 that engages detent recesses in the plate 134. The spring detent is secured at its end to the transmission housing. Lever 132 also carries an actuator element 137 received in the left-hand end of a manual valve spool 139. The spool 139 is received in a valve opening in a transmission valve body 140, which forms a part of the control valve system for controlling the clutches and brakes described with reference to FIG. 1.

As seen in the isometric view of FIG. 6, the lever 132 is actuated by a driver-controlled actuator shaft 142, which is secured to rotary shaft 144 to which the rooster comb 134 of lever 132 is fixed.

When the engine is idling, the powertrain compliance will cause a torsional windup. If the park gear is shifted at that time from a reverse drive position, for example, to the park position, the park pawl tooth 108 will engage a tooth space as it falls into position. As the energy stored in the strained powertrain elements is released, the pawl will engage a park gear tooth with a substantial inertia force impact. Compensation for this inertia force impact will occur as the elastomer inserts 94 deform, thereby eliminating any audible noise and eliminating vibrations in the shift lever mechanism.

Although a preferred embodiment of the invention has been disclosed, it will be apparent to those skilled in the art that modifications may be made without departing from the scope of the invention. All such modifications and equivalents thereof are intended to be covered by the following claims.

What is claimed is:

1. A park gear damper assembly for an automatic power transmission mechanism in an automotive vehicle powertrain having an internal combustion engine and multiple-ratio gearing for establishing torque flow paths to a driven shaft, the driven shaft being drivably connected to vehicle traction wheels;

the damper comprising a park gear with a toothed wheel surrounding a park gear hub, the hub being secured to the driven shaft, the toothed wheel having external park gear teeth on its periphery;

external drive members extending radially outward from the park gear hub;

internal drive members extending radially inward from the toothed wheel;

a park pawl pivotally mounted on a housing portion of the transmission mechanism, the park pawl having a pawl tooth engageable with a space between two adjacent park gear teeth, thereby locking the driven shaft stationary in a vehicle park mode; and elastic elements located between adjacent surfaces of the internal drive members and the external drive members whereby torsional inertia forces are cushioned and the elastic elements are deformed as the pawl tooth enters a park gear tooth space during vehicle park mode;

one or more of the external drive members of the park gear hub being received between adjacent internal drive members with gaps therebetween, thereby defining limits for deformation of the elastic elements as the park gear decelerates over a finite arcuate distance and a peak force of impact of the pawl tooth and the toothed wheel is modified.

2. The park gear damper assembly set forth in claim 1 wherein the engine develops a powertrain torque on torque-transmitting elements of the driveline resulting in a torsional strain;

the elastic elements absorbing the energy of the torsional strain as a torque flow path through the transmission mechanism is interrupted and the pawl tooth enters a park gear tooth space.

3. The park gear damper assembly set forth in claim 1 wherein the pawl is connected to a vehicle driver-actuated linkage mechanism;

a cam member engageable with the pawl to actuate the pawl into engagement with the tooth wheel;

the driver-actuated linkage mechanism having a spring connection to the pawl whereby movement of the linkage mechanism creates a spring load on the pawl urging the pawl toward an engaged pawl tooth position in a park gear tooth space.

4. The park gear damper assembly set forth in claim 3 wherein one or more of the external drive members of the park gear hub are received between adjacent internal drive members with open gaps therebetween, thereby defining limits for deformation of the elastic elements as the park gear decelerates over a finite arcuate distance and a peak force of impact of the pawl tooth and the toothed wheel is modified.

* * * * *